L. BROWN.
MOTION PICTURE KINETOGRAPH AND METHOD OF EXPOSING FILMS.
APPLICATION FILED DEC. 16, 1918.
1,344,616.                                  Patented June 29, 1920.
3 SHEETS—SHEET 3.
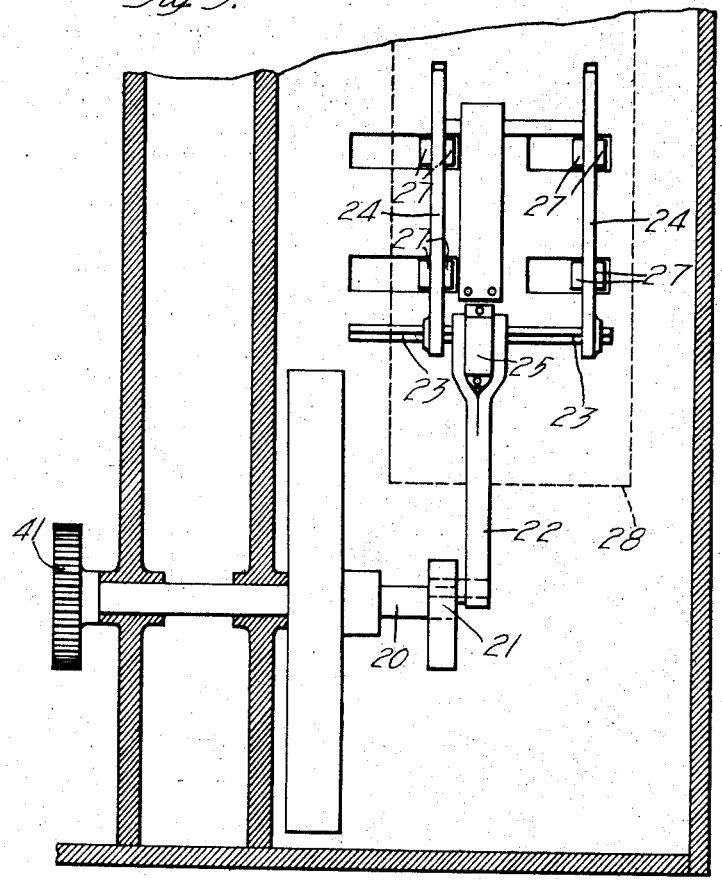
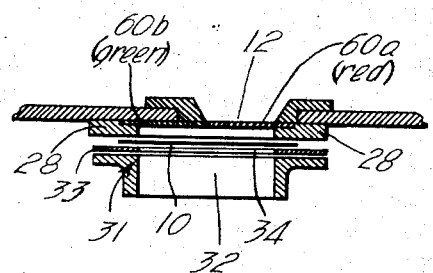
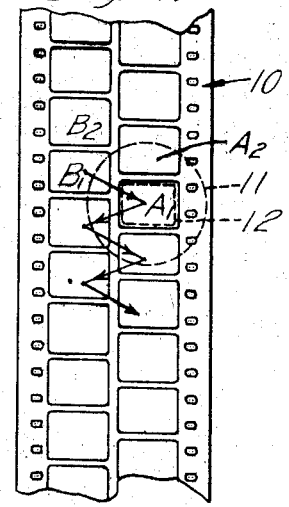
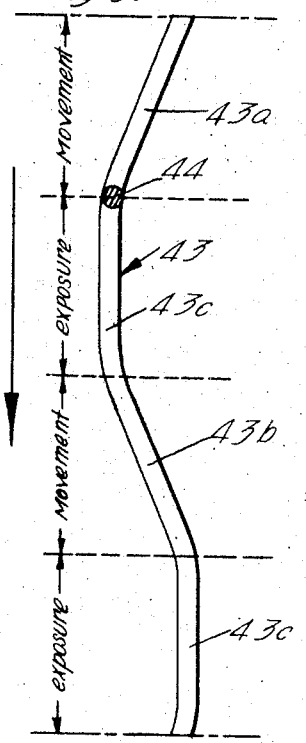
Inventor
Lloyd Brown
by
James T. Bachelor
his Attorney.

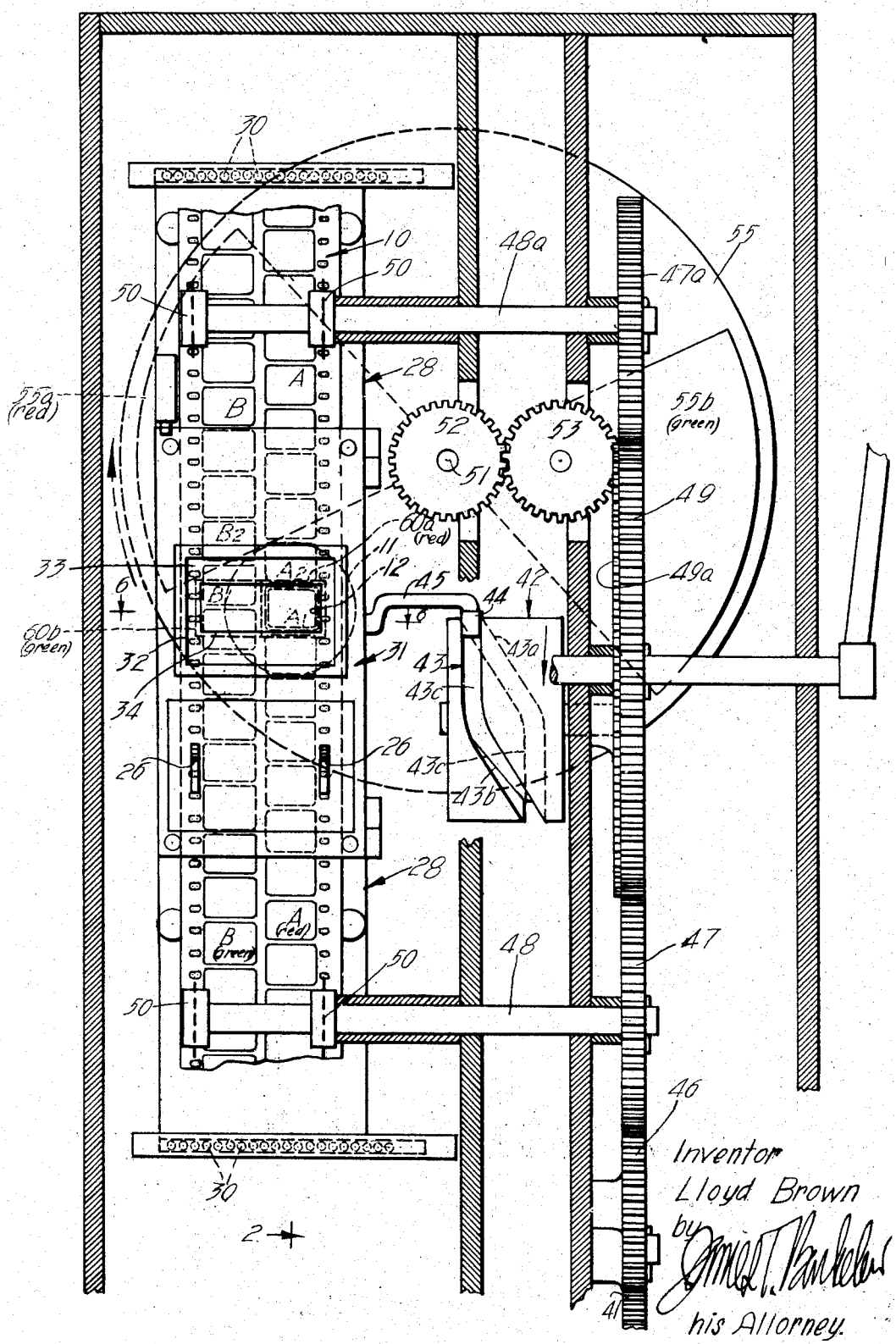

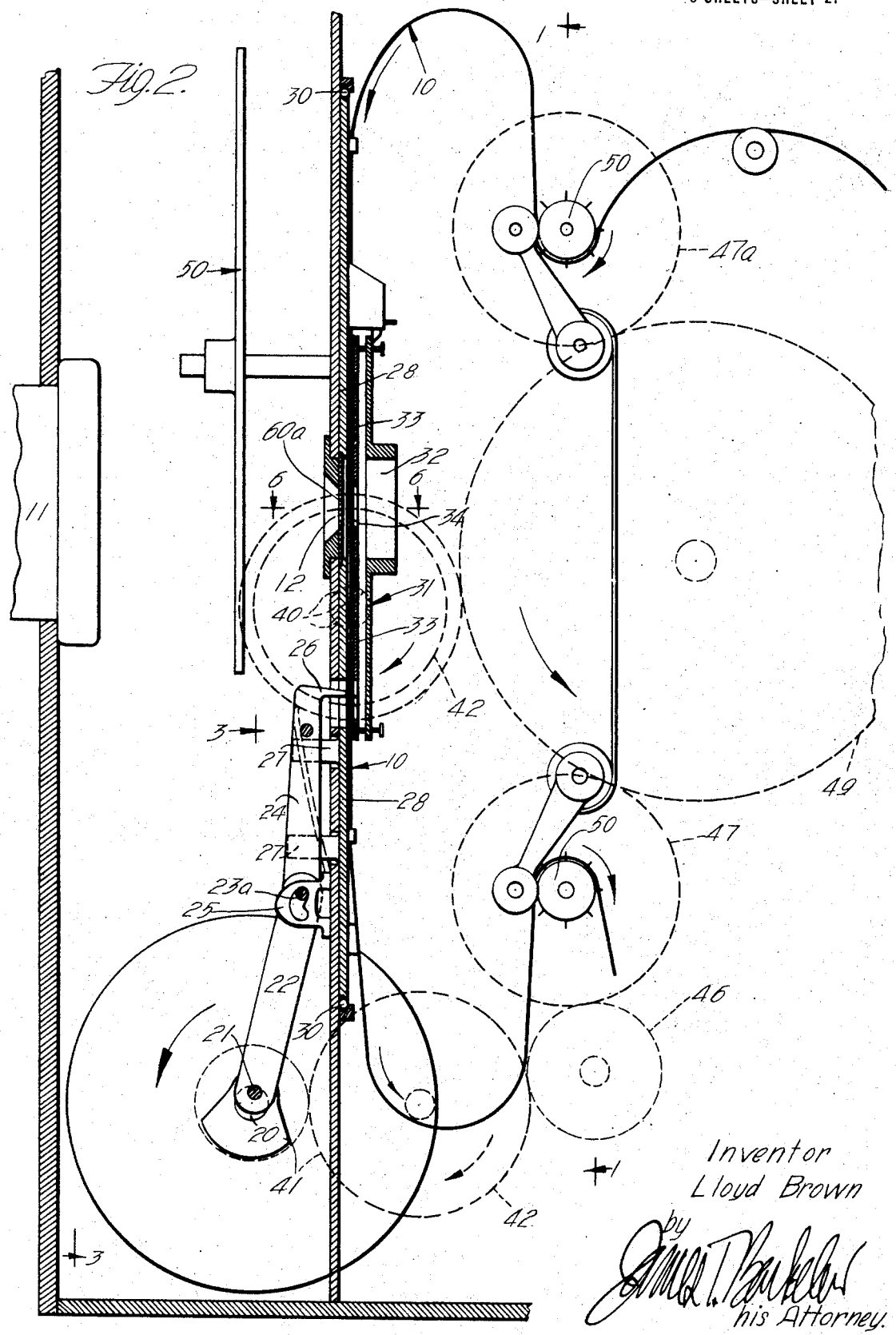

UNITED STATES PATENT OFFICE.

LLOYD BROWN, OF LOS ANGELES, CALIFORNIA, ASSIGNOR TO LLOYD BROWN AND ALEXANDER GRAYDON, TRUSTEES OF A TRUSTEESHIP CALLED SILENT DRAMA SYNDICATE.

MOTION-PICTURE KINETOGRAPH AND METHOD OF EXPOSING FILMS.

1,344,616.      Specification of Letters Patent.      Patented June 29, 1920.

Application filed December 16, 1918. Serial No. 267,046.

*To all whom it may concern:*

Be it known that I, LLOYD BROWN, a citizen of the United States, residing at Los Angeles, in the county of Los Angeles, State of California, have invented new and useful Improvements in Motion-Picture Kinetograph and Methods of Exposing Films, of which the following is a specification.

This invention relates to motion picture cameras and projectors and methods of exposing films, pertaining to the making and projection of motion pictures, either in black and white or in natural colors; and has to do with the reorganization of motion pictures and projectors, or their adaptation, for the purpose of using a novel form of film.

There are many objects of the invention; but among them may be particularly mentioned the following: (1) The provision of mechanism and a method of exposing a form of film whereby a great saving is effected in the length of film necessary for any given number of pictures; and (2) the provision of such mechanism and method as to simplify and make more efficient the taking and projection of colored motion pictures. With these two objects in view as general objects of the invention, there are many other minor objects as will appear from the following specification; such as facility and ease in applying the coloring medium to the film; the simplicity of mechanism by which the invention is carried into effect; and ease of applying my invention to existing cameras.

In a mechanism and method embodying my invention, I use a film which is so moved as to produce, and afterward so moved as to have projected from it, individual pictures which are arranged in two parallel lines or rows along the film, rather than in a single line or row as has heretofore usually been the custom. I make each individual picture (I will call the exposed portion of the film, whether negative or positive, the individual picture) preferably of the same proportions as the pictures hereinbefore in use, but I make each dimension of my picture one-half what it has heretofore been, so that the area of each individual picture in my film is one-quarter what it has heretofore been. The size and the proportions of the individual pictures may of course be varied; but I illustrate my invention with a film having pictures of the usual proportionate dimensions; because it is only necessary with such a reduced picture to use a longer projecting distance, or a greater magnifying power in the projecting lenses; or, in taking the picture, to use a lens of wider angle or to take the pictures at a correspondingly greater distance. Every picture in the two rows is exposed in some regular sequential order; and for this purpose the film is moved both longitudinally and laterally, so that, in some manner or another, it moves in a zigzag motion. Now, except for certain desired features where color is employed, this zigzag motion may be of any character, just so long as all of the pictures are exposed; but where colored pictures are to be taken and reproduced, it becomes desirable, as will hereinafter appear, to make the motion of the film such that pictures in the two rows are alternately exposed; that is, after the exposure of any picture in one row, it is always a picture of the other row that is next exposed. Such an arrangement makes it possible to either apply two color tints solidly to the final projection film, one color tint being applied solidly to one row of pictures and the other color tint being supplied solidly to the other row of pictures; or to apply in the projectors two color filters which are permanently mounted in the projector machine; and for all these advantages I prefer to arrange my film and the kinetograph mechanism in the specific manner herein described. Furthermore, for purposes of simplicity of mechanism, I may also prefer to arrange the pictures in the two rows in staggered relation to each other; so that the movement from one picture in one row to the next picture in the other row always involves both longitudinal and a transverse motion of the film, the motion of the film in every case being thus diagonal to its length.

It will be understood that the movements which I herein explain may be obtained or caused by any one of a variety of different mechanical or other contrivances; but I prefer to illustrate my invention with a simple mechanical arrangement, and one which is most easily applied to existing motion picture cameras. From this illustration of my invention it will be apparent to those skilled in the art how my invention may be applied to various makes of cameras and projectors. It will also be understood that the transverse motion of the film herein described is a relative one—relative to the camera lens and the fixed aperture, or relative to the projection apparatus and its fixed aperture; or, as it might generally be expressed, relative to the line of projection of light. And it will be readily recognized that, like in all cases of relative movement, the desired movement may be obtained by actual movement of either of the elements concerned. But, for purposes of simplicity of mechanism, and accuracy in results, I prefer to obtain this relative motion by actual movement of the film itself.

Wherever I speak of "exposure", "film area", "image area", &c., I mean to include, unless otherwise indicated, both exposure for originally taking a picture and exposure for projection. Furthermore, when reference is made to "aperture plate", "sight aperture", and the like, it will be understood that there is included within such terms a taking lens; a projecting lens; or any suitable opening or aperture for purposes of exposure either in photographing or projecting images.

With these preliminary observations regarding the invention, the invention itself will be best understood from the following detailed description of a preferred form of film and projection or camera apparatus; and for this purpose reference is had to the accompanying drawings in which—

Figure 1 is a vertical section showing my improved film and improved apparatus, said section being taken as indicated by line 1—1 on Fig. 2; Fig. 2 is a vertical section taken on line 2—2 of Fig. 1; Fig. 3 is a vertical detail section taken on line 3—3 of Fig. 2; Fig. 4 is a view showing my preferred form and arrangement of film; Fig. 5 is a diagram showing the development of the cam which causes the transverse movement of the film; and Fig. 6 is a section taken as indicated by lines 6—6 on Figs. 1 and 2.

I show at 10 a film which may preferably be of the usual width and have the usual standard sprocket holes; but this film has, (whether a negative or positive film) two rows of individual pictures A and B arranged along the opposite edges of the film, the pictures being in staggered relation. This is my preferred form of film. The pictures A and B are preferably of the same proportional dimensions as the standard pictures; but their lengths and widths are half the standard lengths and widths; and therefore in any given length of film I get four times as many pictures as is the case with the ordinary film. This fact in itself is a great advantage, because it cuts the length of film 75%.

In the drawings the numeral 11 indicates the position of the lens and 12 indicates the stationary aperture, which of course is of a size corresponding to the size of the pictures A and B. This aperture 12 bears the usual relation to lens 11. The movement of the film is such as to bring into position at the aperture 12, successively the several pictures of the two rows; and, as I have hereinbefore indicated, in this preferred form of film, pictures from the two opposite rows are alternately brought into register with aperture 12. This is done by a zigzag diagonal movement of the film such as is indicated by the arrow lines in Fig. 4. For instance, in Fig. 4 the picture $A^1$ is in register with the aperture 12. By diagonal movement downward and toward the right the picture $B^1$ is brought into register with the aperture, and exposed; and then by diagonal movement downwardly and toward the left the picture $A^2$ is brought into register with the aperture. By this sort of movement all of the pictures of the two rows are successively brought into register with the aperture; and it will be seen that in each movement there is a component longitudinal motion of constant dimension, and a component lateral motion of constant dimension but alternating in direction. The constant longitudinal motion I obtain in any usual manner and by a mechanism which is very similar to those in common use. For instance, I may use the claw mechanism, cutting the amount of motion down to one-quarter usual amount (this will be seen to be the case when it is considered that the film is moved only one-half the height of my half-size picture). With a given number of exposures per second, say sixteen per second, it is obvious that there are only sixteen longitudinal motions of the film per second, and that each one of these motions is only one-quarter the amount of the usual motion. The general nature of the motion producing means being the same, it is a consequence that the linear velocity of the film, while in longitudinal motion, is only one-quarter of the usual linear velocity. There is thus much less strain and wear and tear upon the sprocket holes of the film than is usually the case due to the strain of getting the film quickly into motion, and quickly into a condition of rest again, with the high velocities ordinarily employed.

Such a mechanism I have shown in the accompanying drawing. Here I illustrate a shaft 20 having on its end a suitable crank 21, and to this crank a connecting rod 22 is attached. Connecting rod 22 carries in its end a shaft 23, which, for my specific purposes, may be squared in its outer end portions where it carries the two picker fingers 24. The central part 23ᵃ of this shaft may play in a special cam member 25 which is of such shape as to cause the picks 26 to move down in a straight line but cause them to move upwardly in a curved line and not engage with the film 10 on the upward movement; all as is well known in the art and needs no particular explanation here. However, there is this peculiarity about the fingers 24; that they are made to be transversely movable; and for this purpose they are each confined between sets of guides 27 which project from the film carrying plate 28. These fingers are mounted upon the squared shaft 23, so as to be slidable longitudinally on the shaft; but move with the shaft when the shaft is rotated by action of the connecting rod 22. It will thus be seen that the function of these fingers is the normal function of such elements, except that the fingers are movable transversely with the plate 28. This plate 28 is, to all intents and purposes, a counterpart of the corresponding element of any usual motion picture camera or projector, except that it is mounted to be transversely movable. This may be done by mounting it upon a series or roller or ball bearings as indicated at 30, or in any other manner so as to make it easily transversely movable. The plate 28 has any or all of the usual film engaging means; and the film 10 is in its usual position with reference to the plate—that is against the rear surface of the plate and confined under the gate 31. This gate 31 may have the usual large aperture 32; and it may carry a film presser plate 33 which has an aperture 34 therein of the usual width but of only half the usual height. This is indicated in Figs. 1 and 2. The stationary aperture 12 is directly in front of the film; and this stationary aperture is preferably of a size corresponding to the reduced size of my individual picture. The amount of motion given the film by the picks 26 is only one-quarter the usual amount of motion.

I provide a cam shaft at 40 which is connected by gears with the crank shaft 20; and this cam shaft carries a cam 42 having a cam groove 43 whose function is to cause the transverse movement of plate 28 and of the film. The cam 42 rotates at one half the speed of the crank 21; so that the cam goes through a quarter revolution during the half revolution in which the film is being moved downwardly. Cam groove 43 is consequently arranged with two diagonal portions 43ᵃ and 43ᵇ which extend throughout opposite quarters of the cam, and with intermediate straight portions 43ᵃ. A cam follower 44 is mounted on an arm 45 which is affixed to the plate 28.

Motion is imparted to the gears 41 in any suitable manner. For instance, an idler gear may be used at 46 meshing with gear 47 which drives lower sprocket shaft 48. A similar upper sprocket shaft 48ᵃ may be driven by gear 47ᵃ which meshes with a large gear 49, also meshing with gear 47. Gear 49 may be driven in any suitable manner. Shafts 48 and 48ᵃ carry the usual sprockets 50 which constantly move the film to and from the intermittent movement.

The parts are all shown in the drawings in the position just ready to move the film 10 downwardly and to the right, the picture $A^1$ having just been exposed. From an inspection of the drawings it will be readily understood that, upon movement of the parts in the direction indicated, the fingers 26 will immediately begin to move the film downwardly and at the same time the cam 42 will move plate 28 over to the right. The distance covered by this transverse movement to the right is just sufficient to bring the next picture $B^1$ to the position previously occupied by the picture $A^1$. This, in the ordinary film will be a distance of about one-half inch transverse movement. This transverse movement takes place simultaneously with the downward movement; and both movements take place during approximately one-half revolution of shaft 20 and one-quarter revolution of cam 42. During the next succeeding half revolution of shaft 20 and quarter revolution of cam 42 the film is at rest. The picks 26 being then on their upward movement and the cam follower 44 being then in a part 43ᶜ of the cam groove. During this portion of the movement of the mechanism the film is exposed (either to form a negative—as in a camera—or to project a positive—as in a projector). This exposure is caused in the usual manner by a suitable shutter, say rotary shutter 55 mounted upon a shutter shaft 51 and driven through the medium of gears 52 and 53 from the gear 49 which, for this purpose, may have spiral gear teeth 49ᵃ on one edge. The shutter openings (if there be two openings) are so arranged in position as to uncover the aperture 12 once for every revolution of shaft 20 and twice for every revolution of shaft 42, and during the periods of rest of the film. For this purpose the shutter, if it be a double opening shutter, is geared so as to revolve once for each revolution of shaft 42.

Now it will be apparent from the foregoing description that individual pictures in the two opposite rows of pictures are alternately exposed in my mechanism. In order to take color pictures it is now only necessary to expose one row of pictures through a color filter of one color and the other row of pictures to a color filter of another color, say red and green. These color filters may be arranged in the shutter; or they may be arranged permanently in position and carried by the plate 28 in front of the film. For instance, I may make the shutter 55 a double opening shutter, and one opening thereof may have a color filter of red 55ª and the other may have a color filter of green 55ᵇ; and the shutter is then revolved at the same speed as cam 42 and at half the speed of shaft 20; so that alternate pictures which are brought opposite the aperture 12 will be exposed through a color filter of the alternated colors; and all the pictures in one row will be exposed through a filter of one color and all the pictures in the other row through a filter of the other color. Now the same measure may be achieved by mounting color filters upon the plate 28 in front of the film (fixed with relation to plate 28), one color filter covering one-half of the film in front of the long aperture 34 and the other color filter covering the other half of the film in front of that aperture. This is shown at 60ª and 60ᵇ in Fig. 6 and in Fig. 1. Either of the above mentioned devices may be used for a camera or for a projector; but while either of them (or both of them) may be favorably used on a camera, I prefer, for purposes of projection, to use an entirely different means of applying color to the film. I prefer to take a negative in a camera according to either of the means herein described; and then take this negative and from it produce a positive, in any of the usual manners, and then to immerse one-half of this positive in a dye of one of one color and the other half in a dye of the other color, thereby impregnating the gelatin surface on the film with a suitable dye which will adhere more strongly to the exposed portion of the gelatinous film of the positive than to the unexposed portion. This causes those portions to be most strongly colored in the positive which correspond to those portions of the original scene which were most strongly colored in the color of the dye. A film may be very easily dyed in this manner; it is only necessary to cover one half of the film in some sort of a covering which is impervious to dye and then immerse the film in the dye of one color; and then cover the dyed half with a suitable covering again and immerse the film in the dye of the other color. It will now be seen why, for purposes of color work, I deem it advantageous to make the motion of the film such that the pictures of the opposite rows are alternately exposed; in order to take and project all the pictures in one row in the same color.

Although I have proceeded to describe an appropriate mechanism in some detail, and have described my preferred form of film and its preferred relation to such mechanism, and the operation that suits these particular specific forms so described; it will be understood that I do not thereby intend to limit my invention to the specific details set forth. But rather do I believe my invention to be broad in its nature and not limited, except as is specially so stated in the following claims, which are to be construed broadly within their terms as applying to the broad invention here indicated.

Having described a preferred form of my invention I claim:

1. Motion picture mechanism comprising, in combination with a sight aperture, means to move a film longitudinally relative to said sight aperture for each successive exposure, and means to move the same film alternately in opposite transverse directions relative to the sight aperture, each transverse movement of the film occurring for each successive exposure.

2. Motion picture mechanism comprising, in combination with a sight aperture, means to move a film longitudinally for each successive exposure, and means simultaneously to move the same film alternately in opposite transverse directions relative to the sight aperture, each transverse movement of the film occurring for each successive exposure.

3. Motion picture mechanism comprising, in combination with a sight aperture, means to move a film intermittently longitudinally relative to the sight aperture for each successive exposure, and means to move the same film intermittently and alternately in opposite transverse directions relative to the sight aperture, each transverse movement of said film occurring for each successive exposure.

4. Motion picture mechanism comprising, in combination with a sight aperture, means to move a film intermittently longitudinally relative to the sight aperture for each successive exposure, and means simultaneously to move the same film intermittently and alternately in opposite transverse directions relatively to the sight aperture, each transverse movement of said film occurring for each successive exposure.

5. Motion picture mechanism comprising, in combination with a sight aperture, means to move a film intermittently longitudinally relative to the sight aperture for each successive exposure, and means to move the same film intermittently and alternately in opposite transverse directions relative to said sight aperture, each transverse movement of said film occurring for each successive exposure, with successive exposures of the film taking place through alternating color mediums.

6. Motion picture mechanism comprising, in combination with a sight aperture, means to move a film intermittently longitudinally relative to the sight aperture for each successive exposure, and means to move the same film intermittently and alternately in opposite transverse directions relative to said sight aperture, each transverse movement of said film occurring for each successive exposure, and color mediums movable transversely with said film.

7. Motion picture mechanism comprising, in combination with a sight aperture, a transversely movable film guiding plate, means to impart alternately opposite transverse movements to said plate, and a plurality of color mediums carried by said plate, with one medium covering a portion of the film near one edge and the other medium covering a portion of the film near its other edge.

8. Motion picture mechanism comprising, in combination with a sight aperture, means to move a film longitudinally with respect to the sight aperture, a transversely movable film guiding plate, means to impart opposite transverse movements to said plate, and a plurality of color mediums fixedly mounted on said plate with one medium covering a portion of the film near one edge and the other medium covering a portion of the film near its other edge.

9. In mechanism of the character described, a transversely movable film guiding plate, means to move the plate transversely back and forth, means to move the film longitudinally simultaneously with each transverse movement, and a pair of color mediums carried in fixed position on the plate one medium covering a portion of the film near one edge and the other medium a portion of the film near its other edge.

10. Motion picture mechanism comprising, in combination, an aperture plate, a film having two rows of image areas thereon spaced transversely of the film, means to move the film intermittently longitudinally for each successive exposure, and means to move the film intermittently transversely in alternately opposite directions for each successive exposure, so as to move each successive image area of the two rows alternately into register with the aperture.

11. Motion picture mechanism, embodying an aperture plate, a film having two transversely spaced rows of pictures thereon, the pictures of the two rows being arranged in staggered relation, means to move the film intermittently longitudinally and means to move the film intermittently transversely in movements which are alternately in opposite directions, the intermittent longitudinal and transverse movements being simultaneous so that the film is thus given an intermittent zig-zag motion relative to the aperture, so as to bring successive pictures of the two rows in alternate successive register with the aperture.

12. Moving picture mechanism comprising in combination, an aperture plate, means for moving a film longitudinally relative to said plate, and means for moving a film transversely relative to said plate, the movements of said means being timed to give a resultant diagonal longitudinal travel to the film in opposite transverse directions between image areas, so as to bring a series of offset image areas successively into register with said aperture plate.

13. The method of exposing moving picture films through an aperture plate, which consists in moving each image area relative to the aperture plate by a series of successive alternating longitudinal and opposite transverse movements, so as to bring each image area successively into register with the aperture plate.

14. The method of exposing moving picture films through an aperture plate, which consists in moving each successive image area relative to the aperture plate along successive oppositely diagonal paths, so as to bring each image area successively into register with the aperture plate.

15. The method of exposing a moving picture film through an aperture plate, which consists in effecting a relative movement of said film and aperture plate, so as to expose the successive image areas on said film through said aperture plate along alternating longitudinal and oppositely transverse paths.

16. The method of exposing a moving picture film through an aperture plate, which consists in effecting a relative movement of said film and aperture plate so as to expose the successive image areas on said film through said aperture plate along opposite diagonal paths.

In witness that I claim the foregoing I have hereunto subscribed my name this 7th day of December, 1918.

LLOYD BROWN.

Witness:
VIRGINIA I. BERINGER.